US011199063B2

(12) United States Patent
Ross et al.

(10) Patent No.: US 11,199,063 B2
(45) Date of Patent: Dec. 14, 2021

(54) GAS TIGHT HORIZONTAL DECANTER FOR DRILLING WASTE SOLIDS WASHING

(71) Applicant: RECOVER ENERGY SERVICES INC., Calgary (CA)

(72) Inventors: Stan Ross, Cochrane (CA); Mike Biersteker, Calgary (CA); Wendell Palmer, Cochrane (CA); Paul Sudlow, Calgary (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 614 days.

(21) Appl. No.: 16/081,352

(22) PCT Filed: Mar. 2, 2017

(86) PCT No.: PCT/IB2017/051228
§ 371 (c)(1),
(2) Date: Aug. 30, 2018

(87) PCT Pub. No.: WO2017/149494
PCT Pub. Date: Sep. 8, 2017

(65) Prior Publication Data
US 2019/0063172 A1 Feb. 28, 2019

Related U.S. Application Data

(60) Provisional application No. 62/303,163, filed on Mar. 3, 2016.

(51) Int. Cl.
*E21B 21/06* (2006.01)
*B01D 21/01* (2006.01)
(Continued)

(52) U.S. Cl.
CPC ............ *E21B 21/065* (2013.01); *B01D 21/01* (2013.01); *B01D 21/262* (2013.01); *B04B 1/20* (2013.01); *B01D 2221/04* (2013.01)

(58) Field of Classification Search
CPC ..... E21B 21/065; B01D 21/01; B01D 21/262; B01D 2221/04; B04B 1/20
(Continued)

(56) References Cited

U.S. PATENT DOCUMENTS

| 525,289 A | 8/1894 | Senner |
| 3,228,592 A | 1/1966 | Shapiro |

(Continued)

FOREIGN PATENT DOCUMENTS

| GB | 2094676 | 9/1982 | | |
| GB | 2094676 A | * | 9/1982 | ............... B04B 1/20 |

(Continued)

OTHER PUBLICATIONS

Jaeger, "Hermetically sealed solid bowl decanter—a part of solvent chemistry", Solids/liquids separation practice and the influence of new techniques: Symposium: Papers and programme, vol. paper 5, 1984, PP. (Year: 1984).*

(Continued)

*Primary Examiner* — Walter D. Griffin
*Assistant Examiner* — Shuyi S. Liu
(74) *Attorney, Agent, or Firm* — Greenblum & Bernstein, P.L.C.

(57) ABSTRACT

A hermetically sealed horizontal washing decanter centrifuge for enhanced drilling fluid recovery and drilled solids washing. A process and apparatus for liquid phase-solid phase separation of oil based drilling mud-containing drill cuttings is described including flowing the drilling mud-containing drill cuttings into a horizontal washing decanter wherein the stresses imposed within the decanter act as a wash as the diluent and oil based drilling mud move away from the drill cuttings. Diluent is added prior to flowing the drilling mud containing drill cutting to the hermetically sealed horizontal washing decanter centrifuge. The entire (Continued)

process is performed in a gas-tight environment preventing escape of diluent from the process into the external atmosphere and preventing introduction of gases into the process from the external atmosphere.

20 Claims, 11 Drawing Sheets

(51) Int. Cl.
*B01D 21/26* (2006.01)
*B04B 1/20* (2006.01)
(58) Field of Classification Search
USPC .............................................. 494/39, 66, 82
See application file for complete search history.

(56) References Cited

U.S. PATENT DOCUMENTS

| | | | |
|---|---|---|---|
| 4,120,447 A | 10/1978 | Jaeger | |
| 4,139,462 A | 2/1979 | Sample, Jr. | |
| 4,167,243 A | 9/1979 | Jackson | |
| 4,606,774 A | 8/1986 | Morris | |
| 5,053,082 A | 10/1991 | Flanigan | |
| 5,080,721 A | 1/1992 | Flanigan | |
| 6,550,552 B1 | 4/2003 | Pappa et al. | |
| 6,763,605 B2 | 7/2004 | Reddoch | |
| 9,015,959 B2 | 4/2015 | Pomerleau | |
| 2014/0287470 A1* | 9/2014 | Medoff | C12P 7/10 435/99 |
| 2015/0338162 A1* | 11/2015 | Hoffman | F26B 17/20 34/429 |

FOREIGN PATENT DOCUMENTS

| | | | |
|---|---|---|---|
| WO | 91/08375 | 6/1991 | |
| WO | WO-9108375 A1 * | 6/1991 | ........... B01D 11/028 |
| WO | 92/05877 | 4/1992 | |
| WO | 2003/102359 | 6/2003 | |

OTHER PUBLICATIONS

L. Svarovsky, "Solid-liquid separation", 3rd edition, section 7.5.3, 1990, pp. 277-278.

Official Communication issued in International Bureau of WIPO Patent Application No. PCT/IB2017/051228, dated May 31, 2017.

* cited by examiner

Unstabilized drill cuttings     Sawdust (or stabilizing material)     Stabilized drill cuttings

GAS TIGHT HORIZONTAL DECANTER FOR DRILLING WASTE SOLIDS WASHING

CROSS-REFERENCE TO RELATED APPLICATIONS

This application claims the benefit under 35 U.S.C. § 119(e) of U.S. Provisional Application Ser. No. 62/303,163 filed Mar. 3, 2016, the disclosure of which is expressly incorporated by reference herein in its entirety. In addition, this application is related to commonly assigned, U.S. patent application Ser. Nos. 62/212,754, filed on Sep. 1, 2015 entitled Gas Tight Shale Shaker For Enhanced Drilling Fluid Recovery And Drilled Solids Washing, and commonly assigned, patent applications Ser. Nos. 62/303,169 entitled Gas Tight Shale Shaker for Enhanced Drilling Fluid Recovery and Drilled Solids Washing and 62/303,172 entitled Diluent Treated Drilling Waste Material Recovery Process And System both filed of even date herewith, the disclosures of all of the above which are herein incorporated by reference in their entirely.

TECHNICAL FIELD

The field of art to which this invention generally pertains is the processing of drill cuttings, specifically the separation of the liquid and solid phases.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through conventional mechanical means, and this residual drilling mud is considered to be contamination.

The drill cuttings are commonly known as drilling waste, because they serve no purpose after they have been removed from the wellbore. Thus, the contaminated drill cuttings are typically stabilized with a hulking agent, such as fly-ash, sawdust, or liquid absorbing pellets, to prevent residual free liquids from leaching from the solids during transport. The cuttings are then typically transported to a secure landfill where they are stored indefinitely.

With the evolution of new drilling technologies such as horizontal drilling, shale oil or shale gas fracking, and the increasing cost of drilling fluids, the ability to, and benefits of, recovering and enhancing drilling fluid back to new condition, would have clear benefits.

Accordingly, there is a constant search for new technologies and improvements to existing technologies to increase the efficiency and effectiveness of reclaiming and recycling processes.

BRIEF SUMMARY

A process for liquid phase-solids phase separation of oil based drilling fluid-containing drill cuttings is described including adding a diluent to the drilling fluid-containing drill cuttings and conveying the mixture into a primary feed tube of a horizontal washing decanter centrifuge, the process being performed in a gas-tight environment preventing escape of diluent from the process into the external atmosphere and preventing introduction of oxygen containing air into the process from the external atmosphere.

Additional embodiments include: the process described above where the diluent is added to the drilling fluid-containing drill cuttings at a rate so as to achieve a yield point of the liquids phase of the drilling fluid-containing drill cuttings feed equal to or less than 1.0 Pa, prior to the mixture entering the primary feed tube; the process described above where the diluent is added to the drilling fluid-containing drill cuttings at a rate so as to alter the plastic viscosity of the mixture to less than 5.0 cP, the process described above where the diluent has a flashpoint less than or equal to 37° C.; the process described above where the mixture has a flashpoint less than or equal to 37° C.; the process described above where the diluent has a vapour pressure equal to or greater than 0.1 Torr and less than 750 Torr; the process described above including adding inert gas to the horizontal washing decanter centrifuge so as to maintain an oxygen content of less than 9% by volume within the horizontal washing decanter centrifuge; the process described above where the gas comprises nitrogen or carbon dioxide or fuel gas, or a combination thereof; the process described above where the oxygen content within the horizontal washing decanter centrifuge is maintained below the minimum oxygen content required for ignition of the diluent; the process described above where the solids phase discharged from the horizontal washing decanter centrifuge contains less than 10% by volume diluent; the process described above where the solids phase discharged from the horizontal washing decanter centrifuge contains less than 5% by volume diluent; the process described above where the horizontal washing decanter centrifuge operates at an internal pressure greater than −200 Torr and less than 750 Torr; the process described above including drying the solids phase discharged from the horizontal washing decanter centrifuge to recover substantially all diluent from the solids phase; the process described above where the solids are dried using a hollow flight solids dryer or a heated air or gas dryer; the process described above including pre-treating and/or post-treating processing in fluid flow communication with the separation process through a hermetically sealed conduit; the process described above where the pre-treating and/or post-treating processing includes solvent wash tanks, additional decanter centrifuge (s) or solids drying; the process described above where the diluent comprises a first diluent mixed with the drilling fluid-containing drill cuttings forming a first primary mixture of diluent and drilling fluid-containing drill cuttings, prior to being conveyed into the primary feed tube and a second diluent added sequentially to the rinse inlet of the diluent rinse feed tube so that the second diluent comes in contact with the first primary mixture midway along the beach section of the horizontal washing decanter as the liquids and solids are being separated into separate phase;

the process described above where the diluents are the same or different; the process described above where the diluents have a flashpoint less than or equal to 37° C.; the process described above where the rinse diluent or diluents have a vapour pressure equal to or greater than 0.1 Torr and less than 750 Torr; the process described above in fluid flow communication with one or more additional processes including shale shakers, or Verti-G dryers, or solvent wash tanks, or polishing decanters, or solids dryers, or combinations thereof, being performed in a gas-tight environment, thereby preventing escape of diluent from the additional process or processes into the external atmosphere and preventing introduction of oxygen containing air into the process from the external atmosphere; the process described above where flanges or seals are located at one or more locations including the receptacle for receiving oil based drilling mud-drill cuttings slurries, feed augers, feed pumps, discharge augers or rotary airlocks; and the process described above where the secondary rinse feed tube is located opposite the primary feed tube, the process described above where These and additional embodiments are further described below.

DETAILED DESCRIPTION

Figure 1:
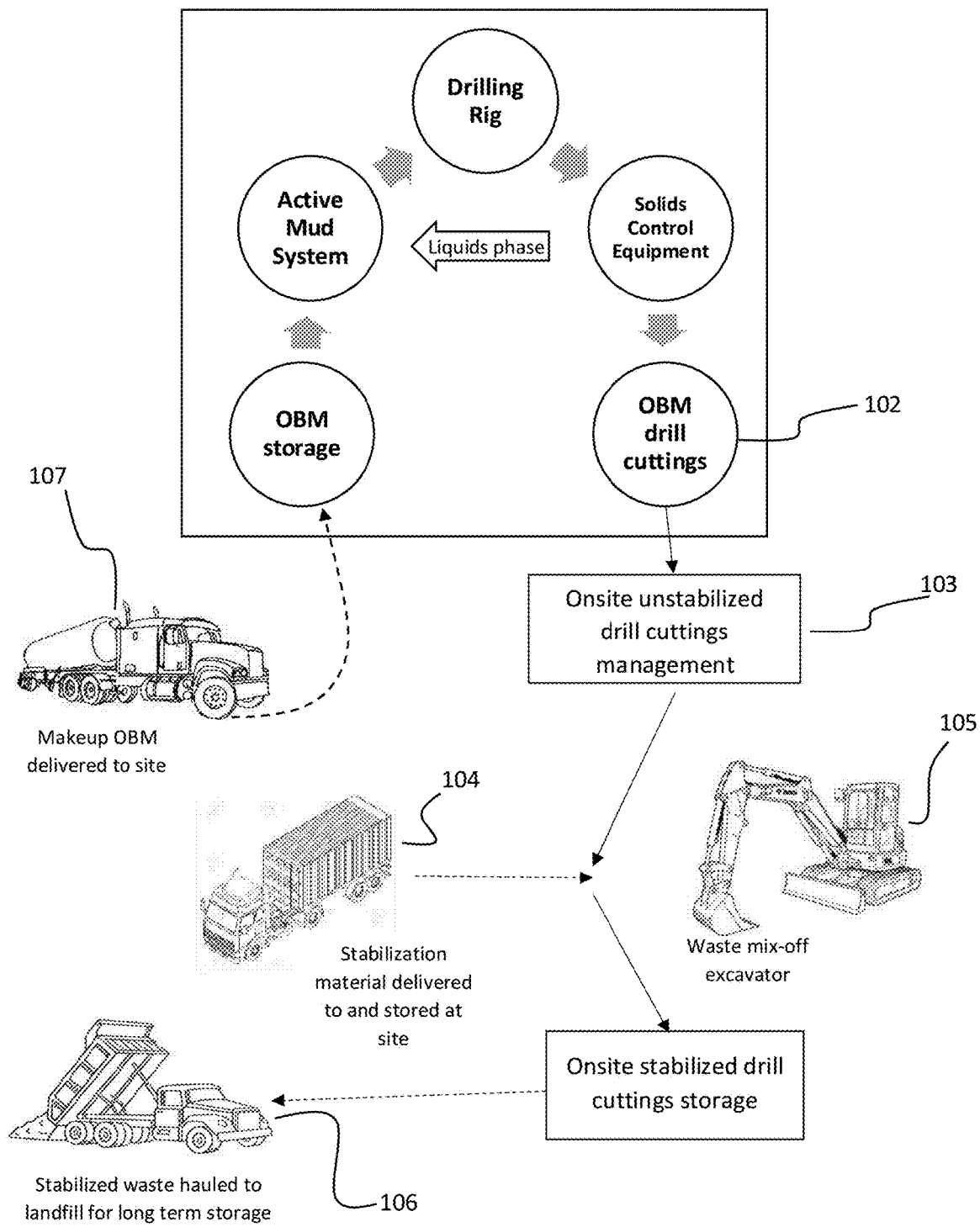
FIG. 1 demonstrates an embodiment of how a typical drilling rig manages fluids and solids operations onsite.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Apparatus and methods to enhance the volume of oil based drilling fluid recovered from the unstabilized drill cuttings by adding a diluent to the unstabilized drill cuttings and mechanically separating the two phases within a gas tight horizontal decanter, prior to other types of solids processes or fluids rehabilitation processes, is described. The process includes conveying the drilling fluid-containing drill cuttings into a gas tight horizontal decanter centrifuge, where at least one diluent is added to the oil based drilling mud containing drill cuttings prior to the drill cuttings being subjected to gravitational stresses, the entire process being performed in a gas-tight environment preventing escape of diluent vapours from the process into the external atmosphere and preventing introduction of air into the process from the external atmosphere.

The diluent is added to the apparatus or process at a rate sufficient to alter the rheology of the fluid properties such that the yield stress is reduced and the drilling fluid releases substantially all of the solids phase. The diluent is typically a flammable solvent and has a flash point equal to or less than 37° C. An inert gas is introduced into the apparatus or process and typically comprises such things as nitrogen or carbon dioxide or fuel gas (also known as natural gas), or any mixture of gasses sufficiently lacking in an oxygen concentration to reduce or eliminate the possibility of an explosion or fire.

An oil based drilling mud-drill cuttings liquid phase-solid phase separation apparatus is also described. The apparatus includes a receptacle for receiving oil based drilling mud-drill cuttings slurries, connected to conduits for conveying away separated drilling mud and drill cuttings. The apparatus additionally contains flanges and seals allowing for the sharing of an inert atmosphere between additional gas tight processes, if the sharing of the inert atmosphere is operationally advantageous. Permitting or promoting the sharing of the inert atmosphere by means of a gas tight conduit will further ensure that the inert gas moves around to keep any oxygen diluted or so low that a fire can't occur, while preventing a foreign atmosphere to flow into or out of the sealed gas tight design of the apparatus; and the apparatus described above in fluid flow communication with one or more of solvent wash apparatus, VERTI-G dryers, decanters or solids dryers.

For ease of understanding, as typically used the terms "Oil based mud", "Viscosity" and "Rheology" are provided as follows: Oil base mud (OBM) is a drilling fluid system that uses oil as the base ingredient, as opposed to water, which is the base used in gel-chem mud systems, brine mud systems or polymer mud systems. Oil base mud is also known as invert, and it typically consists of a mixture of oil, emulsified water and drilling mud additives. Viscosity is best understood as the thickness of a fluid. For example, water has relatively low viscosity, whereas ketchup has a higher viscosity. Rheology, is the science explaining liquid flow including flow in "soft solids". One of the important Rheology properties of OBM is the 'yield point', or the carrying capacity of the fluid. A small solid dropped in a glass of water demonstrates a fluid with no yield point, because the small solid will drop regardless of its size. The same size solid in ketchup may not drop at all because the force of gravity may not be strong enough to break the yield point of the ketchup. If it is heavy enough to exceed the yield point of the fluid it will drop more slowly than the same size solid in water due to the higher viscosity of the ketchup. As with the ketchup, invert is a non-Newtonian fluid and it is commonly modeled as a Bingham Plastic. Bingham Plastics behave like a solid, up to a particular amount of shear stress, when they behave like a liquid; this is known as the yield point of the fluid.

OBM's are typically comprised of a mixture of additives which can be either fluids or solids, collectively forming a useable drilling fluid. OBM's are used by well operators when special fluid characteristics are required including, better cooling/carrying capacity, or better wellbore stability, and/or lubricity for the drill string in horizontal wellbores, which are becoming more common.

Typically, the drill cuttings which are carried up the wellbore are subjected to solids separating devices when the cuttings exit the well bore, such as that of shale shakers or decanter centrifuges. These mechanical separators allow a substantial portion of the liquids phase to be recycled for reuse, while the solids phase is stabilized, stored for a short period of time and transported to landfill for long term storage.

Shale shakers are considered the first line of defence on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they do come in a variety of models, which offer differing gravitational forces, coarse to very fine screen sizes, differing vibratory motions, and as few as one screen, or as many as four, on one or more screen bed elevations.

Shale shakers apply force, usually measured in terms of gravitational forces, ranging between four to eight times greater than earth's gravity. The principals behind a vibratory screen is to create a bed where the solids and liquids phase "bounce", causing the liquids phase to yield under the stresses of the gravity and shaker forces. The yield point is the point where the Bingham Plastic liquids phase transitions from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because conventional shale shakers are a good mechanism to remove a substantial amount of liquids from the solids. However, this fluid typically contains low micron/low gravity solids that would otherwise travel through the porosity of the vibratory screen, rather than be caught on the upper side of the screen with the larger solids.

Horizontal decanter centrifuges are commonly used to remove the low micron solids that otherwise pass through the shale shaker screens. A typical drill site decanter can exert gravitational forces in excess of 1000 times that of Earth's gravity, and as much as 3000 times Earth's gravity force. These forces are capable of removing substantial volumes of low gravity solids, also known as drilled solids, before the low micron/low gravity solids volume can accumulate and become problematic to the drilling operation. Decanters have many designs and operating parameters including shorter or longer beach lengths for example, or shallow or deeper weir settings to facilitate longer fluids retention or a dryer solids discharge. It is up to the designers and operators of the decanter to balance the operating parameters against the specific needs of the drill site.

As oil based mud (OBM) is fed into a rotating decanter-type centrifuge, the centripetal forces exerted by the rotating bowl on the wet cuttings force them to the inside surface of the bowl. The centripetal force on the cuttings increases with the rotational speed of the bowl. At sufficient rotational speed, the centripetal forces on the cuttings will be high enough to overcome the yield strength of the fluid and the large solids will tend to shed fluid at a rate that is slowed by the viscosity of the fluid. If the rotational acceleration of the bowl is not fast enough, the centripetal force on the smallest solid particle within the OBM fluid will not be high enough to break the yield strength of the drilling fluid and the small particles (fines and ultra-fines) will remain in the fluid regardless of how long the fluid remains in the decanter. But if the rotational acceleration of the bowl is high enough to apply a sufficient centripetal force on the smallest solids within the OBM fluid for it to break the yield strength of the fluid, the smallest solids will sink within the fluids. The rate they sink at is governed by Stokes' law which predicts that a particle will sink (or float) and accelerate up to the speed (terminal velocity) where the exerted forces causing the particle to move are equal to the viscous (or drag) forces that oppose the motion.

As illustrated in FIG. 1, the drill cuttings (102) (from the shale shaker) and low gravity solids underflow (102) (from the onsite decanter) are collected at the drill site in three or four sided bins (103) and mixed with a stabilizing agent (104), for example sawdust or liquids absorbing pellets, to absorb the free leachable fluids. The mix off is typically done by means of a wheeled loader or track excavator (105). The stabilized drilling waste can then be transported safely using conventional transport methods, such as sealed end dump trailers. The stabilized drilling waste is transported to specially designed landfills (106) featuring leachate collection systems and impervious liners. Landfills are built for long term storage. Makeup OBM is transported to the site (107) to cover the OBM losses resulting from the mix off process. Thus is the need for an improved method to remove a substantial portion of the oil on cuttings.

Figure 2:
FIG. 2 show photos of unstabilized (left) drill cuttings, (centre) stabilizing (or bulking) agent, and (right) stabilized drill cuttings (ready for storage in a landfill) respectively.

FIG. 2 shows photos of hulking agent, unstabilized and stabilized drill cuttings.

In recent years, advancements have been made to better facilitate recovery of OBM from drill cuttings. One example is the use of a Vertical Cuttings Dryer, also known as a VERTI-G dryer. VERTI-G dryers use centripetal force to exceed the yield point of the fluid and throw it through a screen where it is collected in the liquid ring (also known as the effluent ring). The solids are conveyed downward using an auger/scraper, along the inner side of the screen until they fall off the conical screen, into an open bottom hopper. From there, they are conveyed from the VERTI-G dryer to temporary storage. Typically, a VERTI-G dryer can recover about two thirds of the OBM from drill cuttings, leaving a stackable solids phase that is typically ready for transport to a landfill. The recovered fluids are polluted with low gravity solids and in need of substantial fluids rehabilitation. The reason substantial fluids rehabilitation is required is because the VERTI-G dryer uses an auger to scrape the cuttings off/downward of the screen which causes substantial partial degradation, thereby causing a significant increase in low micron solids passing through the narrow wedge-wire screen. This causes the recovered drilling fluid to require additional rehabilitation through horizontal decanter centrifuges, which is unable to remove substantially all of the low gravity solids. It is important to note that VERTI-G dryers do not like process upsets like that of the feed consistency changing. When for example, the wetness, temperature, age or integrity of the liquid and solids phase changes, a VERTI-G typically requires the operating parameters to be altered for the new feed consistency.

Another example of an oil recovery and solids washing process is demonstrated in commonly owned U.S. Pat. No. 8,820,438, the disclosure of which is incorporated by reference herein, wherein a solvent washing process is employed to dissolve the oil on cuttings, by introducing the unstabilized drill cuttings into an inclined auger tank filled with solvent as the wash medium. The solids are caused to interact with the solvent by means of an auger stirring-while-conveying the solids phase up the wash tank within a counter-current flow of clean solvent. The internal mixing that occurs within the wash tank allows the diluent to dissolve the OBM while eliminating the yield strength of the OBM has on the drilled solids. After a residence time of approximately 15 minutes in each wash tank, the liquid is substantially separated from the drill cuttings, as the cuttings are conveyed up the beach section of the wash tank, after which they fall directly into a drying process wherein the solvent is recovered for reuse and the clean cuttings are ejected from the process. The solvent and oil base mud contain residual low gravity solids which continually spill over the back of each wash tank and are then pumped to a gas tight decanter centrifuge where the low gravity solids are removed using a decanter which is capable of applying sufficient force to the liquids phase to remove the low gravity solids. This low gravity solids phase removed by the "polishing" decanter is also moved to a drying process for solvent recovery, while the solids free liquid phase is sent to a distillation column or flash kettles for solvent recovery. Air is purged and prevented from entering the process by a blanket gas system in combination with seals and fluid legs. Oxygen analyzers are used to ensure that oxygen concentration in the vapour is well below the explosive limit.

While the technology described in U.S. Pat. No. 8,820,438 is a significant step forward in cleaning hydrocarbon contaminated drill cuttings, some challenges still remain including:

1) The equipment described could cost significant dollars and require one or more onsite operators be present to monitor the equipment when in operation. Given that a drilling rig typically only uses OBM for two weeks of a typical four week well, it also means that the technology can only be utilized for 50% of the time, while sitting idle the other 50% of the time
2) To build a commercial processor, centralized to active drilling fields, the processor would need to be built such that it could process a significant throughput each hour for example, 10 m$^3$ per hour. Such a throughput would require a minimum of four double screw wash tanks, each capable of processing 2.5 m$^3$ per hour, as well as the supporting process equipment. To explain the significance of such, consider the following:
   a) The foot print for each wash tank with the supporting feed hopper and solids dryer measures approximately 2.5 meters (wide) by approximately 24 meters (long) by approximately 3 meters tall
   b) Each double screw wash tank requires two 10 hp (horse power) motors and gearboxes for the wash screws, two, 3 hp motors and gearboxes for the lower feeder screws, two 5 hp motors and gearboxes to convey the cuttings from the feeding hopper to the lower feeder screws, one 2 hp solvent pump for the lower injection, one 2 hp solvent pump for the upper injection, at least one oxygen measurement device per wash tank, and one double screw dryer to accept the solids phase from each of the four wash tanks. Consider also, the electrical support equipment required to distribute the required power to each device, and that the electrical control equipment will need to be located away from the process, outside of the explosion proof electrical zoning. Further, each motor will of course require an electrical tub with either a variable frequency drive or contactor, an isolator, a breaker, and a communications port to be routed back to the operator interface equipment.

3) A commercial processor with a solids capacity of 10 m$^3$ per hour would also require a solvent recovery flash kettle, distillation tower, or combination of either, or combination of both, capable of recovering 20 m$^3$ of solvent per hour, which is necessary to maintain a solvent to drill cuttings ratio of 2:1, necessary to maintain solids control in a single gravity force wash tank design.

Considering the forgoing, one can appreciate the complexity of such a design, and the potential for equipment fracture with so many independent, rotating components.

Another example of an oil recovery process is called an Oil Recovery Unit (ORU) and described in U.S. Pat. Nos. 8,287,441 and 8,668,634. These patents detail a process where unstabilized OBM drill cuttings are collected from a conventional shale shaker and conveyed into a horizontal decanter centrifuge. Specifically, an auger delivers the "wet" drill cuttings into the horizontal decanter that is designed to accept heavy, (greater than 50%) solids laden material. The material spills from the auger delivery system and falls into the big bowl decanter which is spinning at such a rate that the drill cuttings are subjected to substantial centripetal forces, for example, 1,000 to 2,000 g-forces. This force causes the heavier solids to settle along the inner wall of the bowl while the liquids phase leaches into the pond section of the horizontal decanter. The solids phase is conveyed to the conical end where it moves up the beach of the centrifuge and is ejected from the bowl section via wear resistant ports. The technology is at least partially effective at removing free liquids on drill cuttings waste, generally achieving a residual liquids of 20% to 50% (by volume), and as low as 10% residual liquids (by volume). The liquids phase flows in the opposite direction from which the solids are conveyed, and is collected at the opposite end of the bowl where the liquids phase spills over the weirs of the howl section. This method of separating the liquids phase and solids phase is unique in that the bowl allows for both a significant removal of the OBM drilling fluid from the drill cuttings and could also achieve a simultaneous reduction of low gravity solids from the liquids phase, which can be as little as approximately 5% solids (by volume).

While the Oil Recovery Unit is capable of reclaiming more oil base mud than conventional shale shakers alone, it has several drawbacks including:

1) The equipment described is very expensive and require one or more onsite operators be present to monitor the equipment when in operation. Given that a drilling rig typically only uses OBM for two weeks of a typical four week well, means that the technology can only be utilized for 50% of the time, while sitting idle the other 50% of the time.

2) For the equipment described to function at its greatest potential, additional heat energy is required, to alter the viscosity of the liquids phase, which is contaminating the drill cuttings. Ideally, the process should maintain a minimum feed temperature of approximately 50° C., which means additional power must be used for the process to function at its greatest potential. Given drilling rigs are always operating in remote areas and otherwise do not have access to grid electricity, diesel powered generators must typically be used to supply the required electric energy. To quantify the significance of the heat energy input, one must consider the fact that it takes 1837 BTU's to raise the temperature of 1 m$^3$ (cubic meter) of unstabilized drill cuttings containing 30% hydrocarbons (by volume) and 5% water (by volume), by 1° C. this presumes there is no loss of heat energy due to inefficiencies in the design.

3) As mentioned, the technology can reclaim more oil base mud than conventional shale shakers, but the drill cuttings still contain residual liquids of approximately 20% to 50% (by volume), and as low as 10% residual liquids (by volume). Given the residual contamination is still high enough to emit a distinct odor of hydrocarbons, and the residual contamination is still visually obvious, the marketability of such a technology as 'environmentally advantageous' is extremely limited.

4) Issues also exist relating to gearbox sizing. Generally, decanter centrifuges are designed to process a slurry with a solids phase of less than 20% (by volume). Dewatering a heavy solids phase is limited by torque in the gear box and subsequently, the technology described in U.S. Pat. Nos. 8,287,441 and 8,668,634 is unable to keep up with fast hole drilling where greater than five cubic meters of oil based drilling mud contaminated drill cuttings are generated each hour.

The process and apparatus disclosed herein utilizes a large bowl gas tight horizontal decanter to simultaneously wash and separate the components of a slurry into a first solids phase with a lower liquids content, and a second liquids phase with a lower solids content. The process and apparatus also details how additional diluent can be introduced to the large bowl gas tight horizontal decanter to facilitate a rinse process (post washing process), while the components of the feed are being separated into separate phases. The embodiment of a simultaneous rinsing process is discussed further below.

Figure 6A:
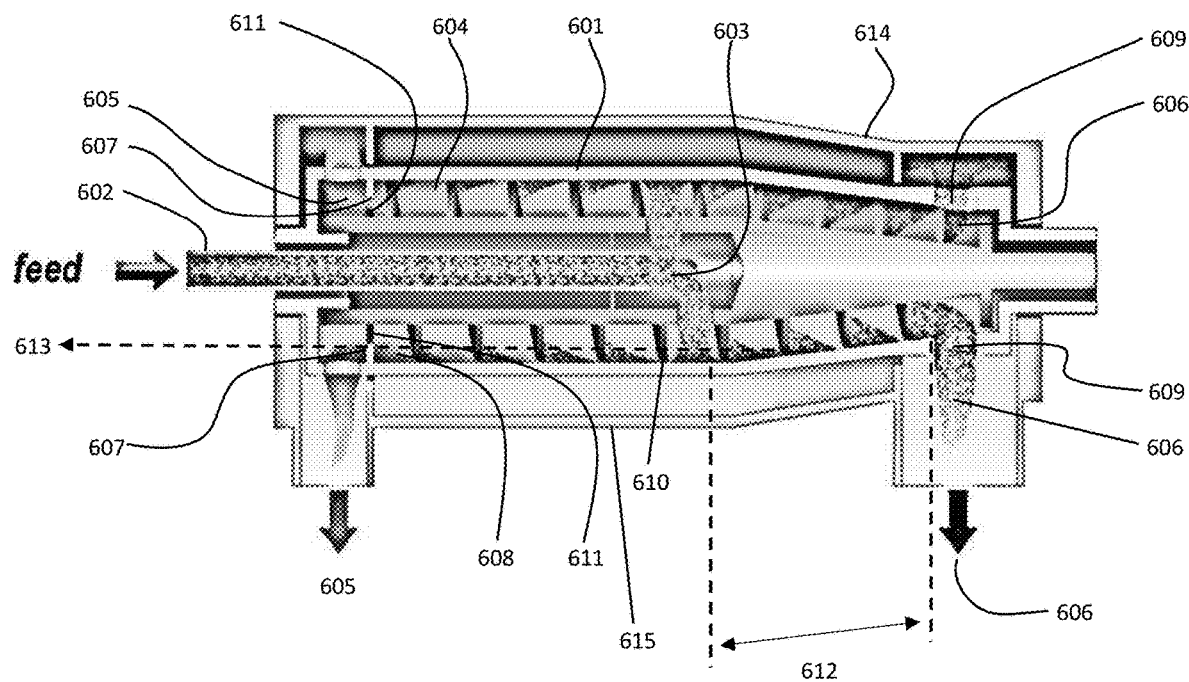
FIG. 6a is an illustration of the inner workings of a typical horizontal decanter embodiment and how the slurry transitions to a liquids phase and solids phase.
Figure 6B:
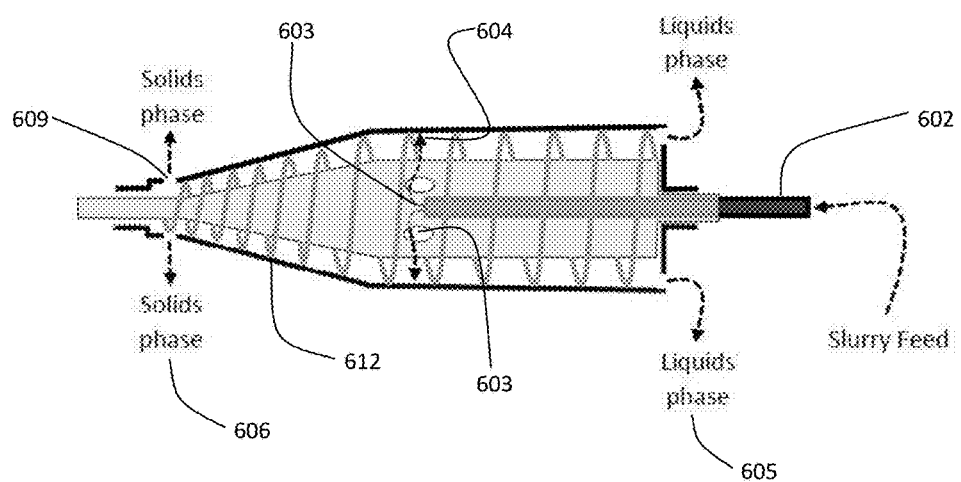
FIG. 6b is a representative line art drawing of a typical decanter bowl and scroll sections.

FIGS. 6 & 6b illustrate a typical horizontal decanter layout. As shown, this typical horizontal decanter arrangement depicts one of the two ends where a feed tube (602) can enter the bowl section (612) and where the liquids phase (containing lesser solids) exits the howl section (605) and solids phase (containing lesser liquids) (606) exits the bowl section (609).

A typical decanter centrifuge is shown in FIGS. 6 and 6b, wherein the large bowl of the decanter (601) is rotating such that when the slurry exits (603) the feed tube (602), it comes to rest along the outer most inside edge (604) of the large bowl. There, gravitational forces are exerted on the solids such that the yield strength of the liquids phase (605) will be overcome and begin to separate from the solids phase (606). The solids being heavier will be forced to the inside surface of the bowl and the liquid level (608) inside the bowl will rise until it reaches the level of the adjustable weir (607). The weirs are located at the opposite end of the decanter to the solids ports (609). The maximum liquid level inside the bowl is set by the adjustable weirs. Liquid will overflow the weir at a flow rate that is proportional to both the wet cuttings feed rate and to the wetness of the feed. The scroll (610) sweeps separated solids (606) to the opposite end (when compared to the liquids overflow). The scroll (610) rotates inside the bowl (601) on an axis concentric to the bowl. The scroll is, essentially, a flited auger that it is designed to move the separated solids axially within the bowl away from the liquid outlets (611) toward the solids outlet ports (609). If the rotational speed of the scroll is the same as the bowl, solids are not transported, but if the scroll rotates at a slightly different speed the solids can be swept along the inside surface of the bowl toward the solids outlet end. The bowl and the scroll are tapered nearer the solids outlet end of the bowl which is commonly called "the beach" (612). As solids are pushed along and up the beach they rise above the liquid level (613), set by the adjustable weir height (607), before they reach the solids outlet ports (609). At this point, any liquids entrained with the solids will tend to flow back down the tapered beach section (612) as the solids are lifted above the liquid level (613) by the scroll (610), thereby draining the solids of liquids before they are swept out of the bowl through the outlet. The mechanical process employed by a horizontal gas tight decanter centrifuge of separating the liquids phase and solids phase is done so within the inner boundaries of the casket lid section (614) which is sealed by means of a gasket or silicone (not shown) to the casket body (615). Gas tight radial seals, for example lip seals or two-lip seals (not shown), provide a low pressure atmosphere barrier between the rotating shaft assembly and the casket lid and body section to ensure the volatile vapour within the decanter cannot escape and oxygen from the outside atmosphere cannot enter.

The drilling waste (a mixture of oil base drilling fluid and drill cuttings) is received and stored until the facility is ready to process the waste. As demonstrated in FIG. 5, the unstabilized drill cuttings are loaded into a hopper (501) which maintains a minimum volume (505) over the feed auger (506), a fluid leg that prohibits the entry of unwanted air to the process, or the escape of a volatile diluent to the atmosphere. The safe minimum level of unstabilized drill cuttings in the hopper can be controlled either by means of a weight indicator on the hopper (not shown) or overhead level transducer (not shown), or by operator observation. The process feed rate is controlled by an electric motor (503) which drives the feed auger (506) or feed pump (507), which allows conveyance of the solids to occur at a controlled and measured rate, also known as characterization of the flow.

The shearing action inside a typical horizontal decanter centrifuge causes vapours or mist to be produced and emitted from the centrifuge outlet openings and shaft openings. This problem is of significant concern when the diluent is selected from those which include the characteristics of a vapour pressure that is greater than or equal to 0.1 Torr and less than 750 Torr (all Torr measurements described herein have been corrected to gauge pressure at 20° C.), and having a flash point of less than 37° C. In cases where the properties of diluent, or properties of the diluent and unstabilized drill cuttings combined are within the aforementioned parameters, then safety, due to toxicity of the vapour or mist, or due to flammability of the mist or vapour, can present a serious concern. A solution to all these issues is to hermetically seal the centrifuge by building the centrifuge with shaft seals, a flanged and gasketed casket to maintain a required operating pressure, and sealing the inlets and outlets of the decanter with flanged connections which allow a flexible conduit or bellows to isolate process vibration.

Figure 3:
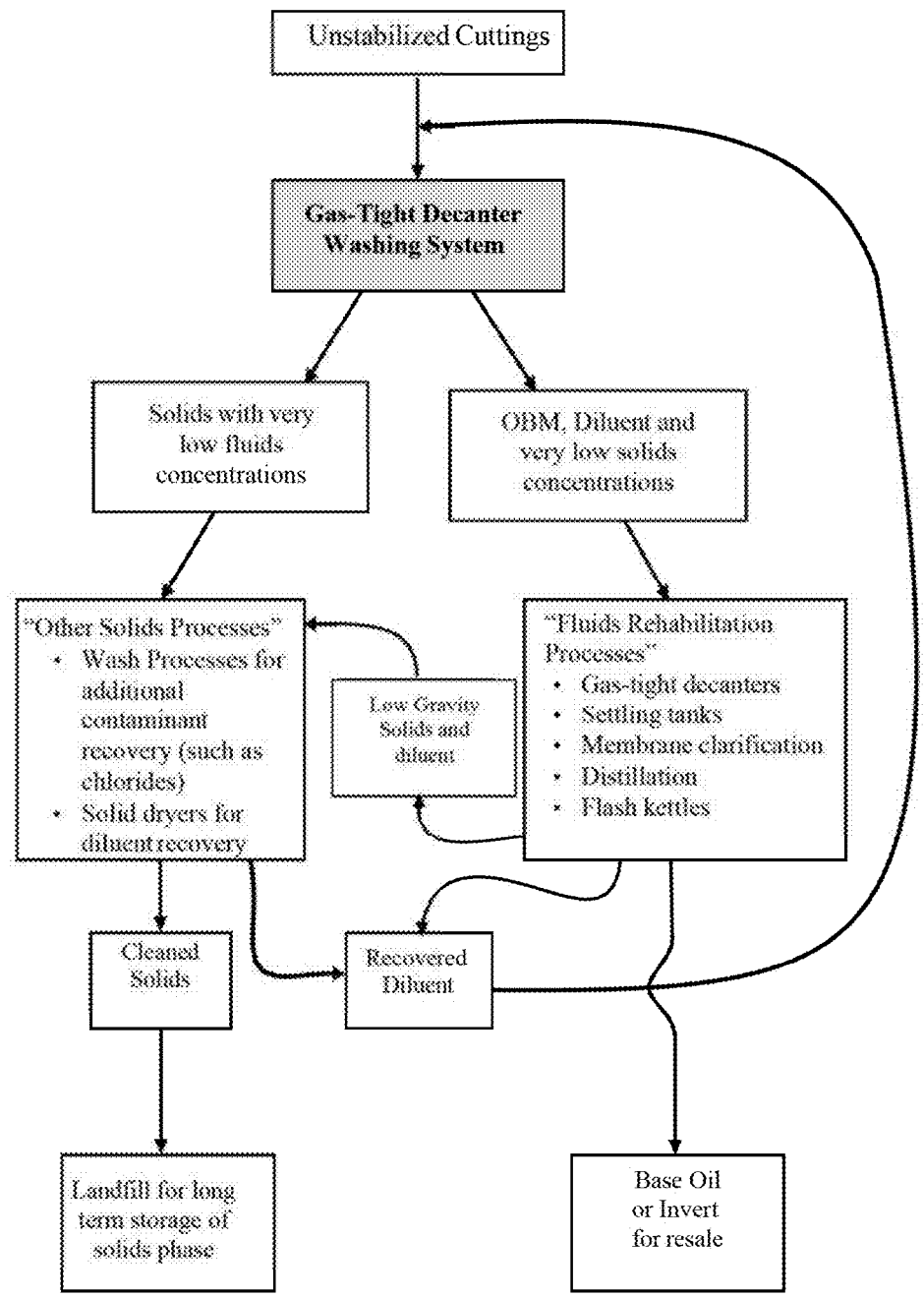
FIG. 3 demonstrates an embodiment of how a diluent can be added to the feed of a gas-tight horizontal decanter to recover substantially all of the OBM in a commercial solids washing process.

FIG. 3 is a flow chart demonstrating the movement of the liquids phase and solids phase relative to other processes. As demonstrated by the figure, the gas tight washing decanter is to be used as the primary washing apparatus and the processed drilling waste (solids with very low fluids concentrations) is then moved to a solids drying process for diluent recovery. Alternatively, following processing of the unstabilized cuttings in the gas tight washing decanter, the processed drilling waste could be moved to a chlorides wash system, to remove less visible contamination, beyond the obvious hydrocarbon contamination of the unstabilized cuttings feed product. The gas tight washing decanter is intended for maximum liquids removal from solids, which will result in low gravity solids being carried with the liquids phase. Additional fluids rehabilitation is thus required, which can come in the form a gas tight liquids polishing decanter wherein low gravity solids are removed from the liquids, or settling tanks, or distillation equipment, etc.

Diluent is added (504) to the unstabilized drill cuttings feed auger (506) to allow the less viscous diluent to mix with the cuttings feed, thereby causing the OBM liquid in the wet cuttings feed to have a lower yield point, or to eliminate the yield strength entirely, and lowering the viscosity of the liquid, and facilitating separation of the liquids phase and solids phase when they are subjected to gravitational or centripetal forces to settle and separate the solids from the liquid. The rate of diluent additions is sufficient to eliminate or significantly reduce the yield point and to reduce the (plastic) viscosity of the liquids phase in the unstabilized drill cuttings feed. The length of the conveyor between the hopper and the inlet of the feed tube of the gas tight horizontal decanter is of less importance to the embodiment except that the length must be long enough to ensure there is adequate mixing of the diluent and unstabilized drill cuttings during the term of conveyance. The volume of diluent added to unstabilized drill cuttings would be approximately 1:1, with a minimum ratio being 1:5, and a maximum ratio being 5:1. The "ideal ratio" of diluent to unstabilized drill cuttings could be influenced by capital cost of the equipment, operating costs for the facility, and throughput versus maximizing drilling fluid recovery. Table 1 has been included to show the predicted resulting yield point (represented in Pascal's) and predicted resulting plastic viscosity (represented in Centipoise) of a mixture of diluent and unstabilized drill cuttings, at various ratios. For the purposes of obtaining representative data for Table 1, hexane was mixed with oil base drilling mud to determine the rheological changes, and the data was used to build the predicted Plastic Viscosity (PV represented in centipoise cP)/Yield Point (YP represented in pascals Pa) table below.

TABLE 1

| Ratio of diluent to unstabilized drill cuttings | Temperature | Resulting PV (cP) | Resulting YP (Pa) |
| --- | --- | --- | --- |
| 0:1 | 50° C. | 25 | 4.5 |
| 0:1 | 0° C. | 89 | 12 |
| 0.1:1 | 0° C. | ~4.9 | ~1.3 |
| 0.5:1 | 0° C. | <1.0 | <1.0 |
| 1:1 | 0° C. | ~0.5 | ~0.5 |
| 1.5:1 | 0° C. | ~0.5 | <0.5 |

Figure 4:
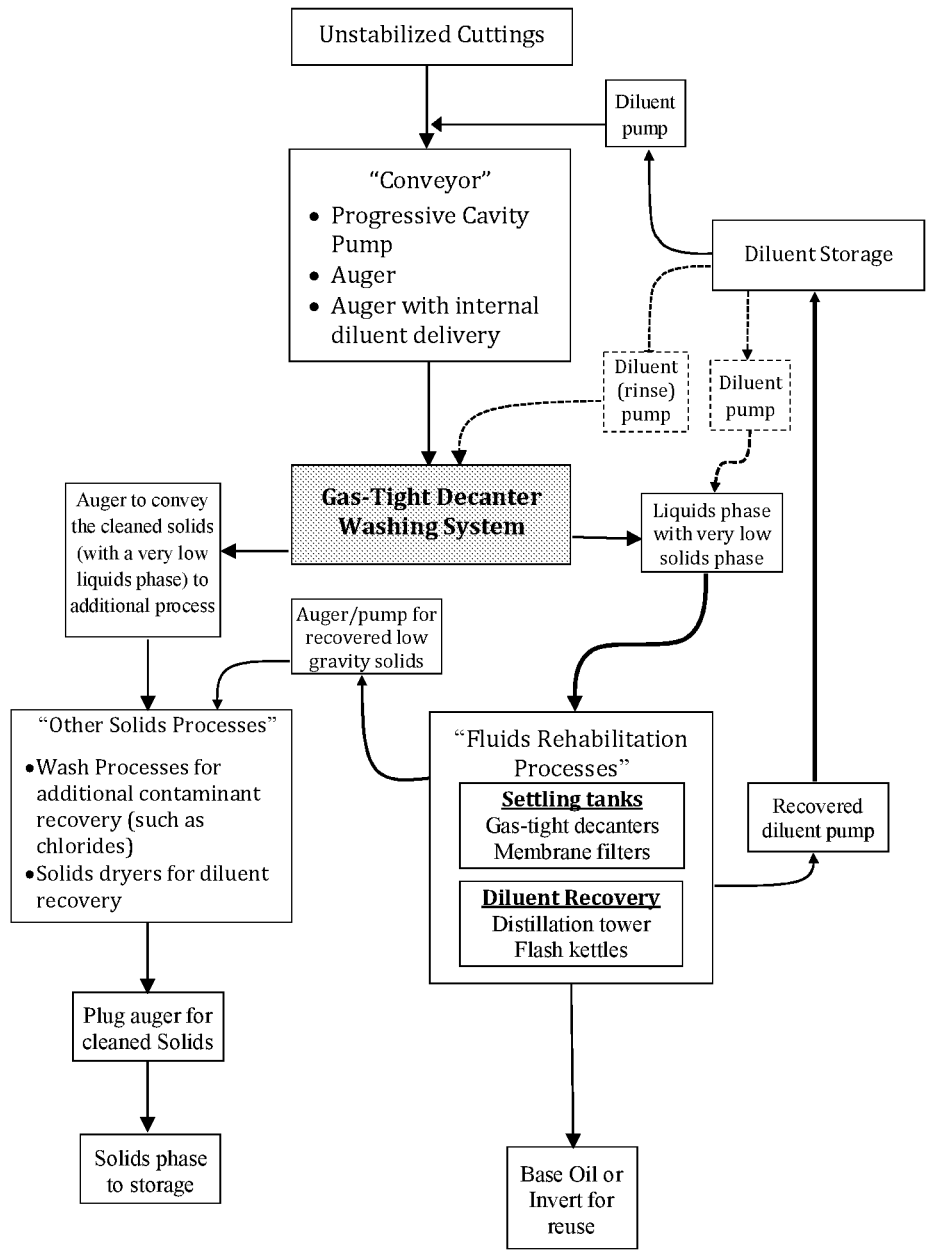
FIG. 4 is an illustration of where diluent can be mixed with the unstabilized drill cuttings to facilitate the most effective recovery of OBM and clean drill cuttings, while recovering diluent used in the enhanced recovery process.

To increase the efficiency of the separation of the liquids and solids phase, a diluent or mixture of diluents is added to the cuttings feed process and the apparatus is sealed in such a way to prevent the enhancements from causing harm to additional processes or operators within the area, thereby creating a solids phase and liquids phase that are better defined and manageable in other processes as further demonstrated below, and further illustrated in FIG. 4. Unlike FIG. 3, which illustrates the transition of the phase and the position of other processes relative to the embodiment described within, FIG. 4 illustrates the embodiment flow chart in greater detail, showing how and where the diluent is added for the best results of both a solids phase with substantially lower volumes of residual oil base drilling fluid, and how the liquids phase achieves a quality of substantially no solids phase, prior to other processes. FIG. 4 also depicts exemplary pre- and post-treatment processing.

Figure 5A:
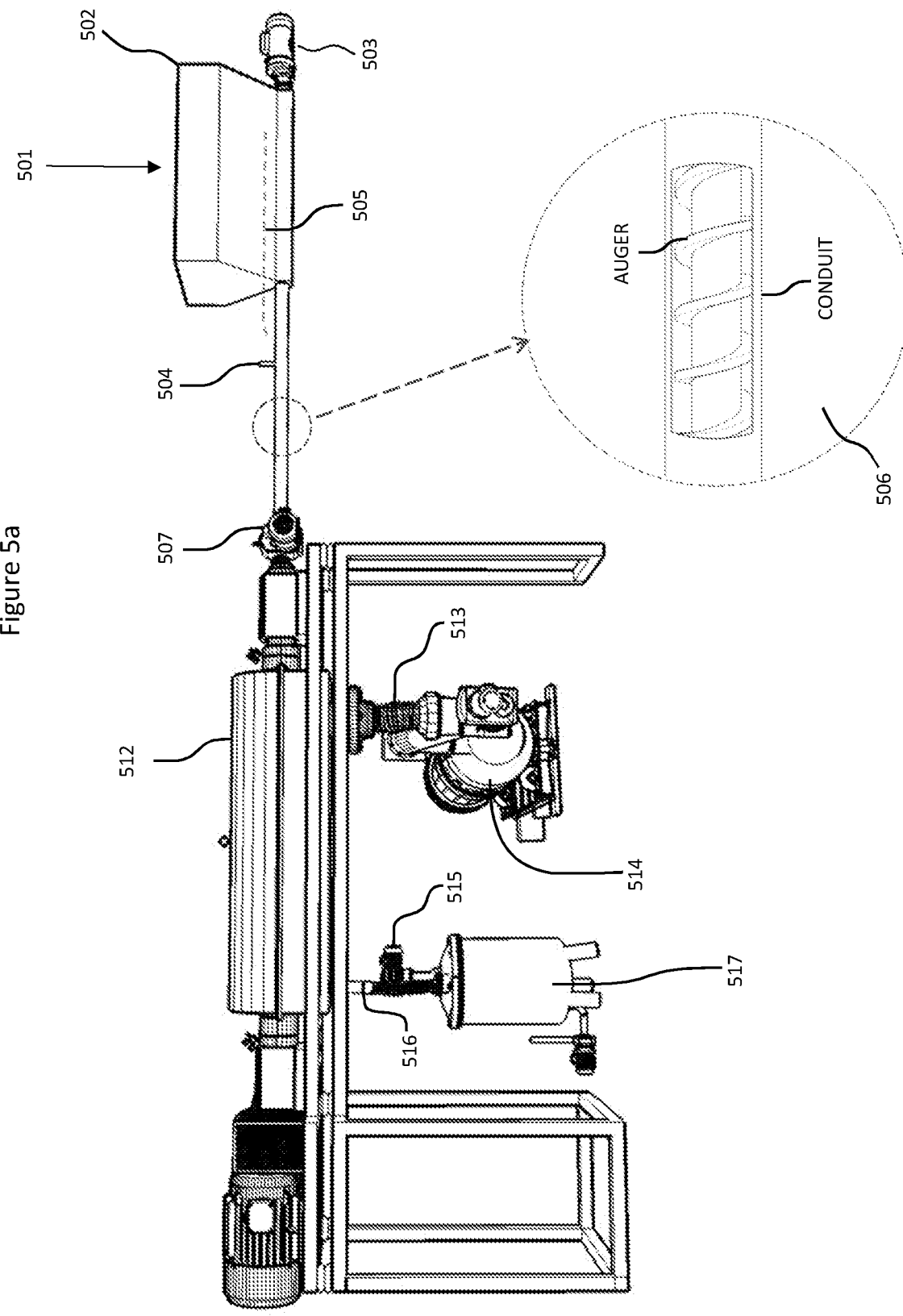
FIG. 5a shows an embodiment of an apparatus useful in methods as described herein.
Figure 5B:
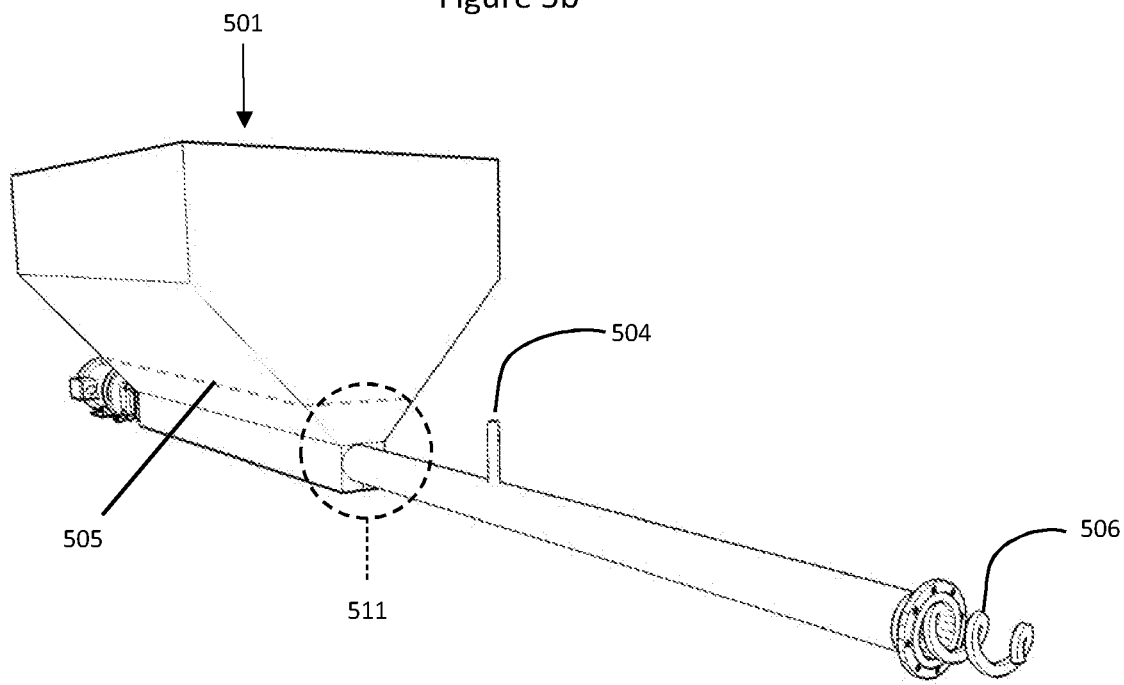
FIG. 5b is an illustration of a hopper and auger conveyance system embodiment to convey the unstabilized drill cuttings while allowing diluent additions and maintaining a gas tight barrier between the outer atmosphere, feed of unstabilized drill cuttings and the inlet of a gas tight apparatus.
Figure 5C:
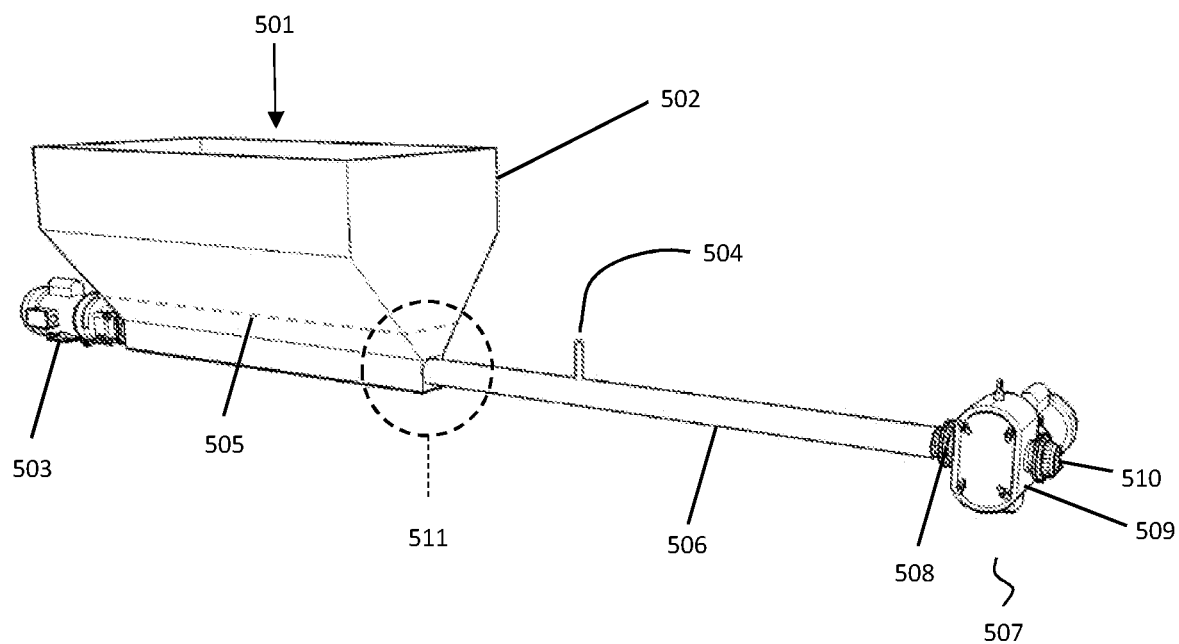
FIG. 5c is an illustration of a rotary lobe pump embodiment to prevent fluidic unstabilized drill cuttings and diluent from moving forward into the apparatus and to maintain accurate characterization of the slurry feed by means of a positive displacement pump.

FIGS. 5a, 5b and 5c illustrate how the unstabilized drilling waste is conveyed into the process while maintaining a fluid/solids leg (511), to prevent the ingress of air containing oxygen into the gas tight horizontal wash decanter through either:

a) a conventional auger (506) or augers, depending on positioning or elevations of various components of the process or, a minimum term for adequate mixing of the diluent and un stabilized drill cuttings;

b) positive displacement pump, for example, a conventional progressive cavity pump or rotary lobe pump (507), wherein a conventional auger (506) (enclosed in a casing or conduit) would either force feed the inlet of the pump (508), or allow the viscus slurry to fall into the inlet of the pump such that the pump lobes can facilitate the positive displacement motion within the casing of the pump (509), causing the slurry to exit the pump (510). Either conveyance method will allow diluent to be mixed with the solids during the conveyance.

To increase the wet OBM cuttings feed rate, or to increase the low gravity solids (LGS's) separation rate, or to increase the solids dryness, or all, or some of the foregoing, would be to add a low viscosity, diluent (504). The diluent must be chosen for its specific characteristics, but for the purposes of this invention, generally diluents with a vapor pressure (corrected to 20° C.) equal to or greater than 0.1 Torr and less than 750 Torr, and further having a flash point of less than 37° C. will quickly dissolve into solution with the oil in the OBM and lower or eliminate the yield strength and lower the viscosity. The diluent must be added prior to the drilling waste being fed into the gas tight horizontal decanter to facilitate the best recovery results of both processed solids and liquids.

The best washing/recovery results of the processed solids is directly related to the rheology of the fluid phase, gravitational stresses, centrifuge design and particle sizes. In order to achieve the most effective recovery of OBM from the drill cuttings, the operator would need to alter the chemistry, for example by changing the ratio of diluent to the liquids phase of OBM drill cuttings, or changing the mechanics of the process by altering the process feed rate, centrifuge bowl speed, scroll speed, weir depth, etc. In co-owned U.S. Pat. No. 8,820,438 it was found that the cleanest the processed drill cuttings could become as a result of the solvent wash process was equal to the level of residual OBM in the cleaning solvent. Thus, a multiple of wash tanks were needed to ensure the contaminated solvent of the first wash tank was substantially contained in the first wash tank, and cleaner solvent was substantially contained ill the second (or subsequent) washes. In short, the drill cuttings that are conveyed up the beach section will only equal the cleanliness of the cleaning solvent (diluent) last in contact with the cuttings.

Optionally, in an effort to maximize the removal of OBM from the drill cuttings, diluent can be added at another location in the decanter, such as on the beach section (near where 612 & 613 intersect) between the liquid interface level (the "pond") and the solids outlet port, to facilitate a rinsing method in addition to the previously described embodiment of the centrifuge washing method. The theory and design of such is discussed in section 2.3.6.4 & section 2.3.8.2 of the Decanter Centrifuge Handbook (first edition) by Alan Records and Ken Sutherland, the disclosure of which is herein incorporated by reference in its entirety. The handbook explains that a rinse can be added along the beach section, near where the pond ends, and the embodiment is further explained in the following paragraphs and FIGS. 7 a-f referenced within and described below.

Figure 7A:
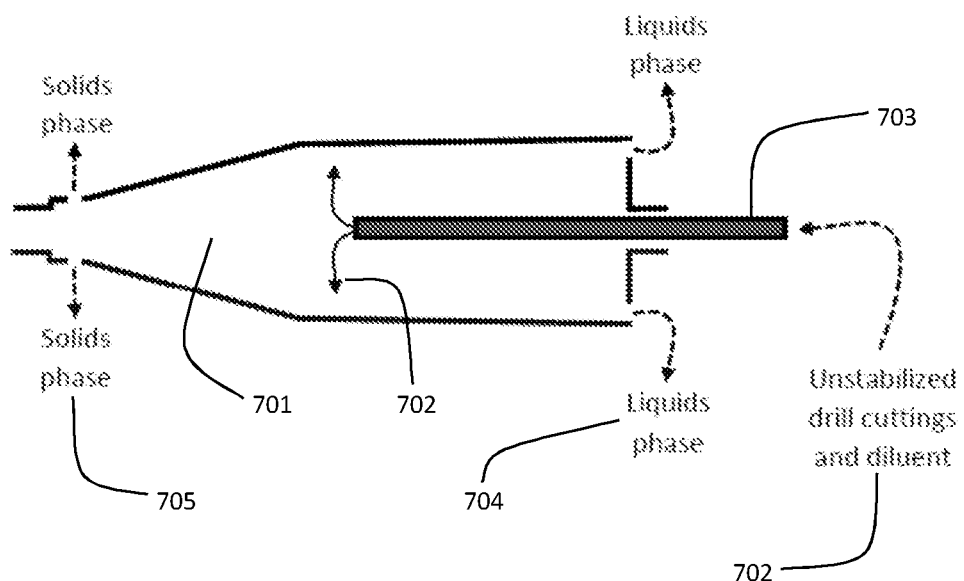
FIGS. 7a, 7b, and 7c show various representative designs for a primary feed tube and a primary and secondary (rinsing) feed tube.

FIG. 7a has been included to illustrate the use of a gas tight horizontal wash decanter to process a mixture of diluent and unstabilized OBM drill cuttings (702). The illustration provides an overview of how a mixture of diluent and unstabilized drill cuttings can be fed into the bowl section (701) by way of the primary feed tube (703), and subsequently where the separate phases exit the bowl section (704 and 705). The illustration depicts the primary feed tube (703) entering through one end of the hollow shaft of the howl section, nearer the liquids phase (704) outlet. While not shown in FIG. 7a, the primary feed tube can be arranged to enter through either end of the bowl section, for example, nearer the end where the solids phase (705) exits the bowl section, or nearer the end where the liquids phase (704) exits the bowl section.

Figure 7B:
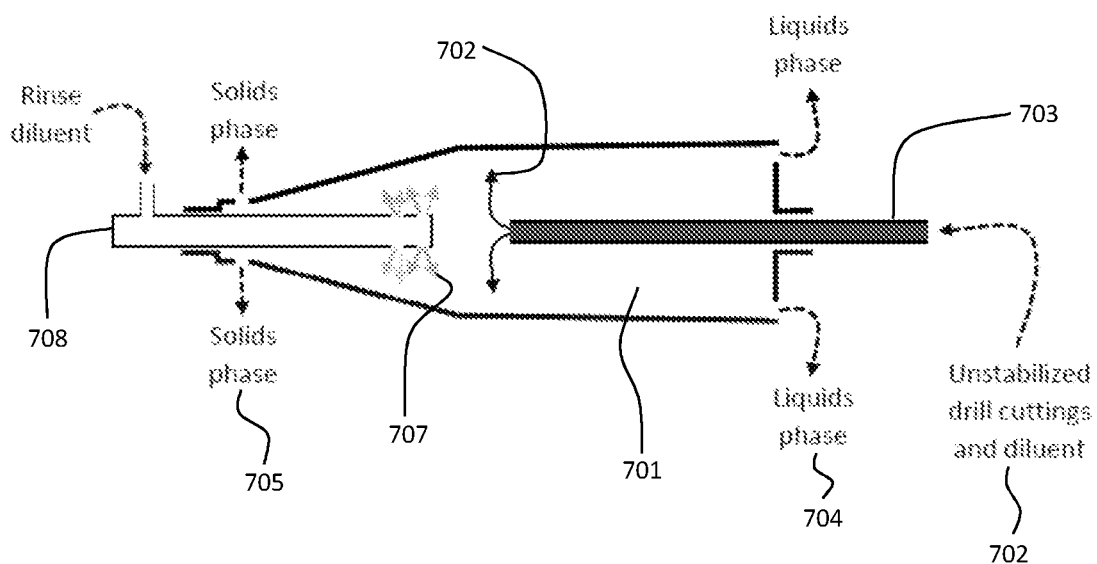
Figure 7C:
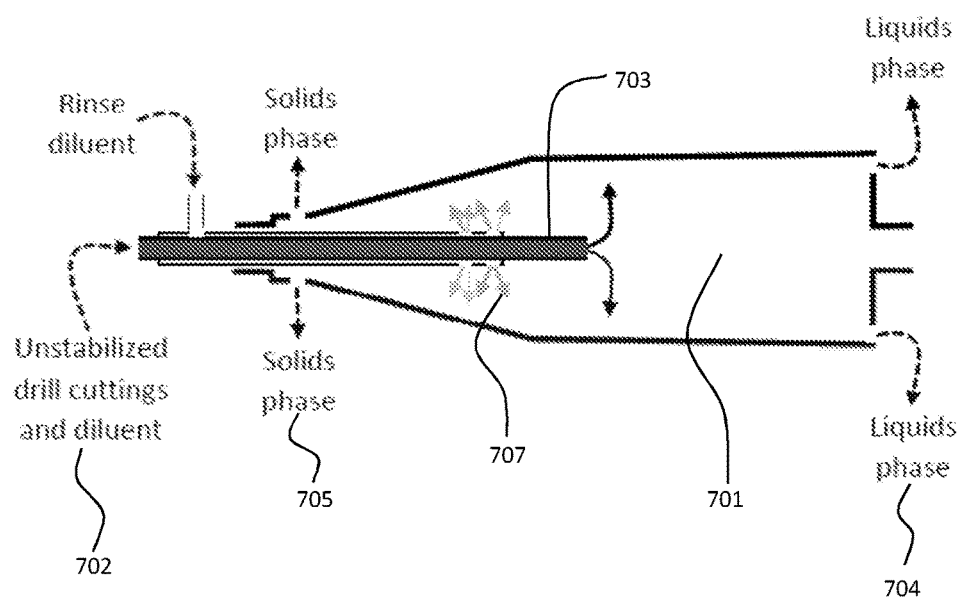
Figure 7D:
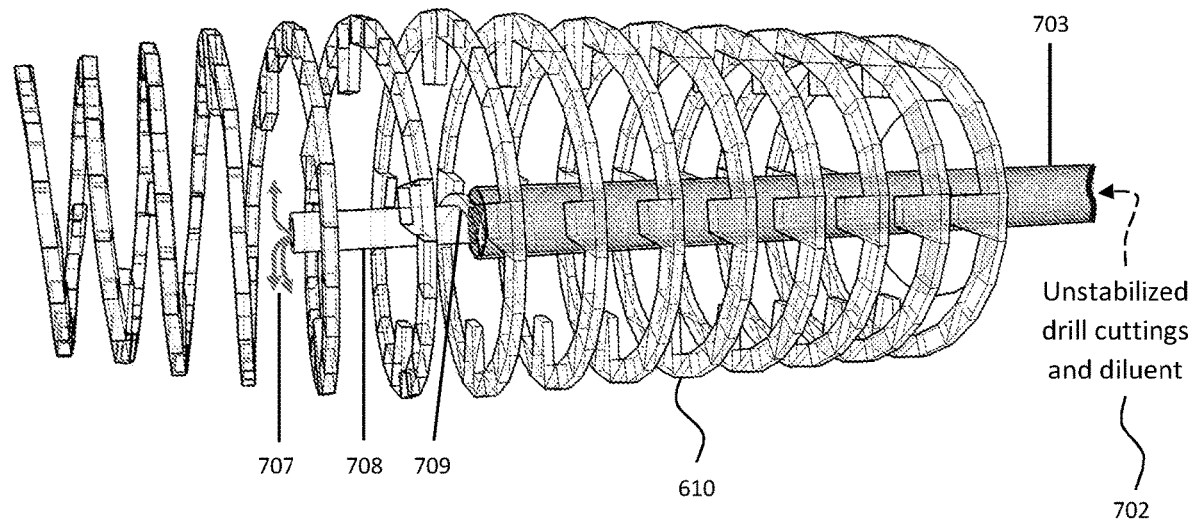
FIG. 7d is an x-ray view of the feed tube and ribbon flight of the scroll section (without the inner, solid portion of the scroll and shaft sections). The illustration shows a combination primary feed tube which utilizes an auger for conveyance and a secondary (rinsing) feed tube incorporated within the hollow shaft of the auger.

FIGS. 7b, 7c, 7d, 7e and 7f illustrate an optional rinse feature to enhance the cleanliness of the processed solids phase, or to achieve a maximum recovery of the liquids phase, or both, or a suitable level of each, as can be chosen by the operator of the process, or as required by additional (or supporting) gas tight processes. Specifically, FIG. 7b illustrates how a secondary diluent rinse feed tube (708) can be incorporated in the gas tight centrifuge design, separate and opposite the primary feed tube (703). FIG. 7c is an alternate arrangement to FIG. 7b, capable of delivering the rinsing diluent (707) while not prematurely mixing with the mixture of diluent and unstabilized drill cuttings (702) using a combination primary feed tube and secondary rinse feed tube, in one. While not illustrated separately, this combination primary feed tube and secondary diluent rinse feed tube could also be arranged to enter the hollow shaft of the howl section, nearer the liquids phase outlet (704). However, such a design should result in the feed tube being built of heavier materials to combat the harmonic vibration of the longer feed tube, which is a common cause of feed tube failure. Further, the greater thickness of materials would reduce the inner working diameter of the process feed tube, likely resulting in a higher propensity for plugging of the feed tube.

Figure 7E:
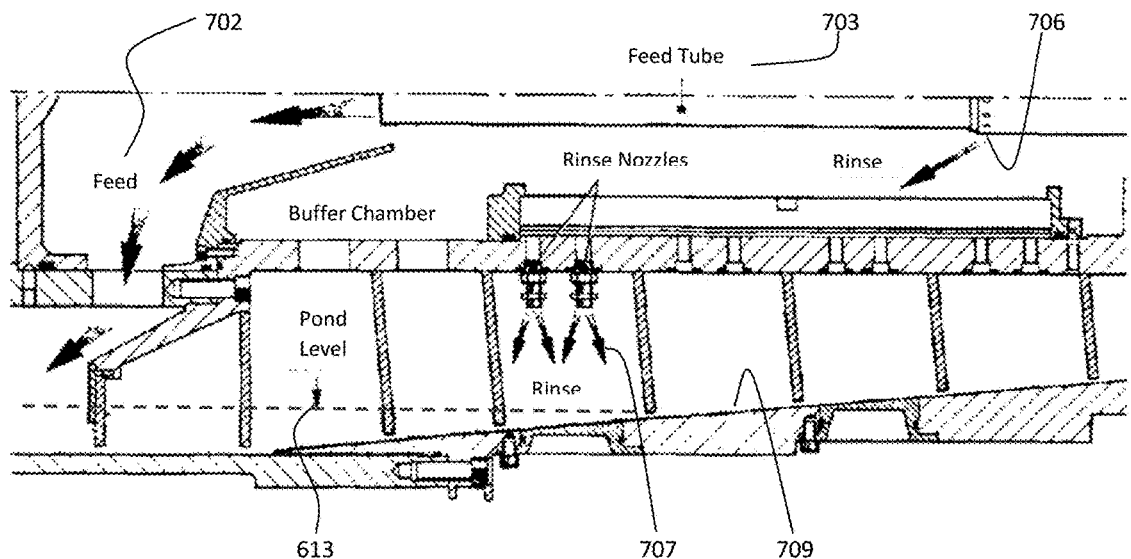
FIGS. 7e and 7f show a detailed representation of how a primary feed tube and secondary rinse feed tube can be designed.

FIG. 7e further describes the embodiment proposed in FIG. 7c. FIG. 7e is a cross-sectional illustration taken from section 2.3.6.4 of the Decanter Centrifuge Handbook, which details the mechanics of a diluent rinse system (706) along the beach section (709) of a horizontal decanter centrifuge.

Figure 7F:
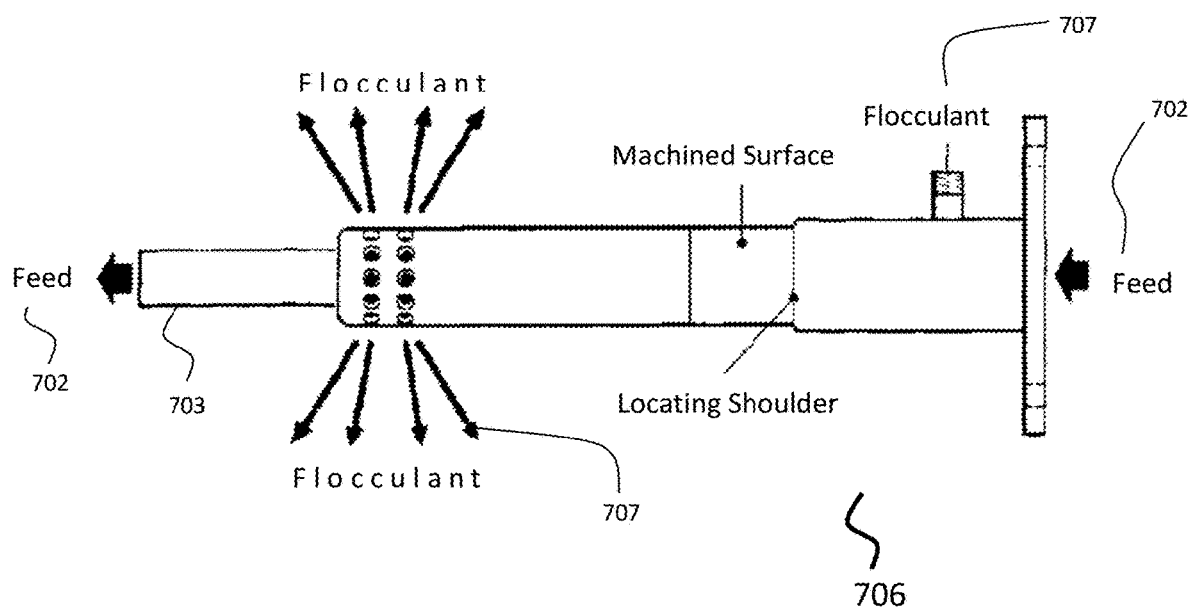

FIG. 7f is an illustration taken from section 2.3.8.2 of the Decanter Centrifuge Handbook to detail a design of the feed tube (like FIG. 7c), wherein the feed tube incorporates the secondary diluent rinse delivery system (706) with the primary feed tube (703). It is important to note, the Decanter Centrifuge Handbook appears to focus on the addition of a flocculent to help remove suspended solids from the liquid phase by causing the solids to be attracted to one another, thereby increasing the density of the solids. The embodiment described herein would be operated with a low weir (607) setting, to create a very shallow pond depth (613) within the bowl section (701) of the gas tight horizontal wash decanter centrifuge and thus, the addition of a flocculent would be highly impractical. The rinse diluent (707) would be limited to the diluents described within the present disclosure.

The amount of diluent (707) required to facilitate an effective rinse is not a random or unlimited volume. In fact, too much rinsing diluent can cause slippage of the solids phase on the incline of the beach section (709). In order to ensure the solids phase isn't 'slipping' (sliding back down the beach section), the rinse diluent additions should be limited, based on three factors:

Voidage—the spaces between the drill cuttings particles that is otherwise occupied by residual OBM and diluent, (or in limited cases, gaseous airspace)

Absorption—the volume of liquids absorbed by the drill cuttings as they are conveyed from the pond onto the beach section Porosity—the empty spaces, holes or fractures within the cuttings particles (which are typically naturally occurring)

The calculation for rinse diluent additions is obtained by dividing the bulk density into the density of the processed drill cuttings (for a voidage value) and adding the volumetric values of absorption and porosity, multiplied by the production rate of processed drill cuttings. When the latter two are unknown, the voidage calculation presumes the surface absorption and porosity values in the processed drill cuttings are greater than zero. The calculation for an effective diluent rinse volume is further illustrated in Table 2 below.

TABLE 2$^{Notes\ 1\&2}$

| | Weight | Volume | Calculation | Result |
|---|---|---|---|---|
| Solids Particle Density (in its natural/compressed state) | 2.65 kilograms | 1 litre sample | Weight/Volume 2.65/1.0 = 2.65 | Density = 2.65 (Kg/L) |
| Dry Solids Bulk Density (in its processed state) | 1.7 kilograms | 1 litre sample | 1.7/1.0 = 1.7 | Density = 1.7 (Kg/L) |
| Porosity of particles (presumed >0 and given a value of "X") | | | X (volume) | Volume = X |
| Surface Absorption (presumed >0 and given a value of | | | Y (volume) | Volume = Y |
| | | | Calculation | |
| Rinse Diluent Volume$^2$ (RDV) | | | RDV = (1 − (1.7/2.65) + X +Y} multiplied by (the production rate of the solids phase exiting the decanter) | |

Note 1
The values in the table are for illustrative purposes only and do not necessarily reflect expected or measured parameters of the washing decanter Note 2
Rinse Diluent Volume is a minimum volume of diluent required for an effective rinse, proportional to the volume of processed solids leaving the solids phase of the wash decanter As illustrated in FIG. 3, once the drill cuttings have been largely cleaned of all but residual OBM contamination, the clean drill cuttings are conveyed to either additional cleaning processes, for example a water wash process to remove residual chlorides still remaining on the drill cuttings, or a solids dryer (514) by means of a flexible conduit (513) for vibration isolation between the gas tight horizontal wash decanter and the solids dryer, to remove residual diluent and free water, if any should remain. Typically, one would use a HOLO-FLITE solids dryer as described, for example, in commonly assigned U.S. Pat. No. 8,820,438, the disclosure of which is incorporated by reference herein, where heat transfer fluid is pumped through both the jacket of the dryer and the auger fighting to maximize the heat transfer area. Optionally, a conventional heated air/gas dryer could also be used for circumstances where high concentrations of low micron/low gravity solids are present.

The recovered liquids phase consisting of OBM, low gravity/low micron solids and diluent poses a significant risk to operators and processes if handled incorrectly so it is essential that the liquids phase be sent for fluids rehabilitation within a process suited to manage the risks. As the liquids phase drains from the gas tight horizontal decanter it will pass through a flexible conduit (516) or hose to allow for vibration isolation between the processes. If the liquids phase must reside in a holding tank (517) for even a short period of time, then the holding tank should be equipped with a mixer (515) or agitator pump to ensure the solids are unable to prematurely settle. Ideally, the liquids phase should transition to either an enclosed gas tight inclined plate clarifier, or secondary gas tight decanter designed for maximum liquids clarity through the removal of low micron/low gravity solids, for example, as illustrated in commonly assigned U.S. patent application Ser. No. 62/212,754, filed on Sep. 1, 2015 entitled Gas Tight Shale Shaker For Enhanced Drilling Fluid Recovery And Drilled Solids Washing, the disclosure of which is herein incorporated by reference.

Figure 8A:
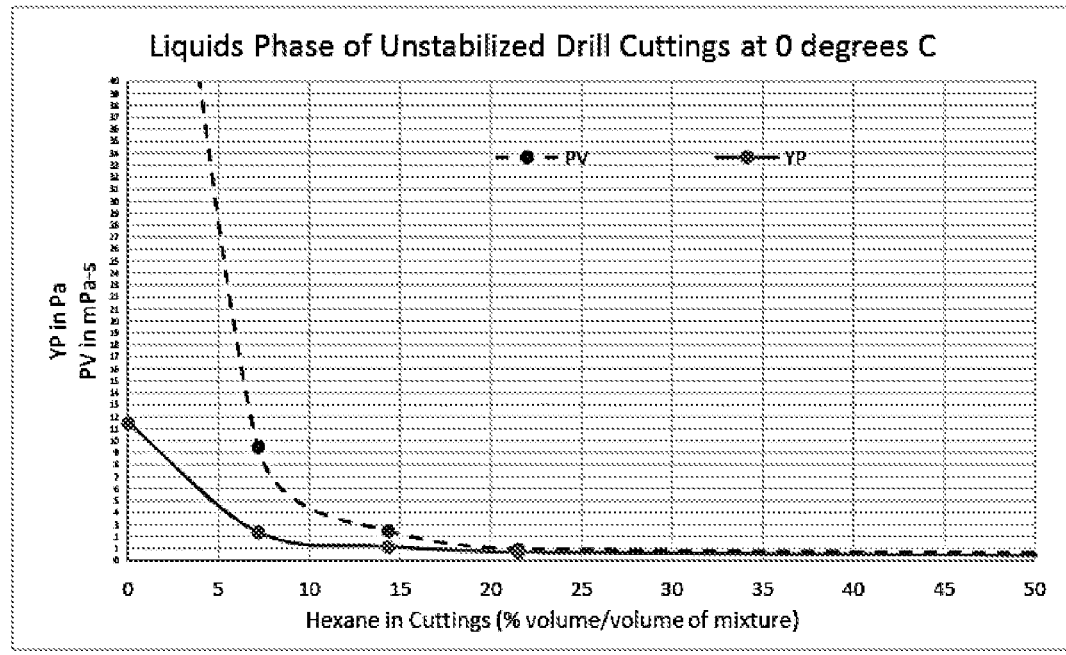
FIG. 8a demonstrates the effects of adding hexane to the liquids phase of OBM contaminated drill cuttings and 8b shows the estimated OBM rheology properties of a typical OBM system.
Figure 8B:
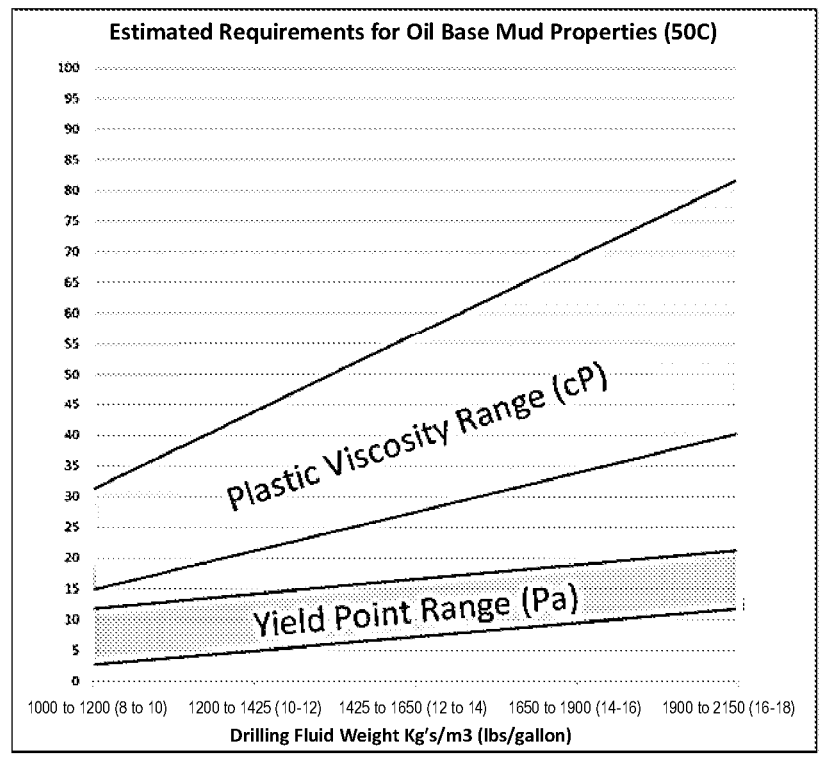

FIG. 8a demonstrates the substantial alteration to the Yield Point and Plastic Viscosity of OBM drilling fluid when even low volumes of a diluent are added (for example, hexane). FIG. 8b demonstrates the estimated (and often typical) properties of OBM drilling fluid and thus, a diluent added to alter the Yield Point and Plastic Viscosity to values equal to or less than 1.0 (Pa) and 5.0 (cP) respectively, would be unique and represent a substantial improvement in the art.

A research trial was commissioned to determine how effective a diluent would be to aid the horizontal decanter at removing OBM from drill cuttings. A Kubco manufactured decanter (Model #K-ORU) was used to test the horizontal decanter for its ability to remove more OBM than its intended design. The decanter featured a ribbon flight auger to feed the 36"×70" bowl section, which was capable of a maximum of 2,000 gravitational or centripetal forces.

Given a Kubco decanter is not available in a gas-tight design, measures were taken to ensure worker safety during the research trial, including continuous monitoring of the atmosphere in the work area. Further, no equipment was permitted to be operational other than the minimum essential to the trial (such as that of an excavator to clean out the clean cuttings bin), and any electrical equipment that was utilized was explosion proof by design.

A total of five tests were conducted during the research trail including:

1) A "dry run" wherein unstabilized OBM drill cuttings were fed to the decanter at a feed rate of 2 m$^3$ (cubic meters) per hour. A 20 litre sample of the processed cuttings were collected for analytical;
2) A second "dry run" wherein unstabilized OBM drill cuttings were fed to the decanter at a feed rate of 6 m$^3$ per hour. A 20 litre sample of the processed cuttings were collected for analytical;
3) Prior to the third trial being conducted, onboard heaters were used to pre-heat the conveyance auger to a temperature of 50° C. While the unstabilized OBM drill cuttings were not expected to move from the ambient temperature of 0° C. up to the conveyance auger temperature, it is believed that some heat input would achieve better results than were visually observed from the first trial. The third "dry run" began wherein unstabilized OBM drill cuttings were fed to the decanter at a feed rate of 2 m$^3$ per hour. A 20 litre sample of the processed cuttings were collected for analytical. Visual results showed a slight improvement over the first trial. The Kubco decanter and supporting conveyance auger equipment was then left to cool for about 90 minutes in preparation for the fourth trial;

4) The fourth trial began with a "dry run" of unstabilized OBM drill cuttings being fed to the Kubco decanter at a feed rate of 2 m³ per hour, for 20 minutes. This was done so that the operator could monitor his operating parameters and ensure the equipment was tuned for good operating results. Hexane was then mixed into the feed of unstabilized OBM drill cuttings at a rate of 950 litres per hour and permitted about 2 minutes of contact time, prior to the mixture conveying into the Kubco decanter. At the 10 minute mark of the test a 20 litre sample of the processed cuttings was collected for analytical. The diluent was added to the feed for a total of 15 minutes, at which time test #4 was considered complete and the feed rate was changed for test #5. Visual observations of the clean cuttings showed a substantial improvement over subsequent tests;

5) The fifth test was started when the feed of unstabilized OBM drill cuttings transitioned from 2 m³ per hour to 5 m³ per hour. The diluent feed rate was 950 litres per hour and again, permitted about 2 minutes of contact time prior to the mixture conveying into the Kubco decanter. At the 10 minute mark of the 15 minute test run, a 20 litre sample of the processed cuttings was collected for analytical. Visual observations of the clean cuttings showed no obvious change over the fourth test:

Following the successful completion of test #5, the diluent additions were discontinued and an unmeasured "dry run" was completed, allowing what remained of the unstabilized OBM drill cuttings to flush the Kubco decanter of any residual diluent.

The samples were analyzed by an independent third party using a 50 millilitre retort and the results are expressed in Table 3.

TABLE 3

| Sample # | Unstabilized OBM drill cuttings feed rate per hour | Diluent feed rate per hour | Feed temperature | Residual oil on cuttings (% by weight) |
|---|---|---|---|---|
| 1 | Product (pre-test) | 0 | 0° C. | 20.97% |
| 2 | 2 m³ ("dry run") | 0 | 0° C. | 16.68% |
| 3 | 6 m³ ("dry run") | 0 | 0° C. | 16.16% |
| 4 | 2 m³ (heated "dry run") | 0 | ~50° C. | 17.16% |
| 5 | 2 m³ (w/diluent) | 0.95 m³ | 0° C. | 7.56% |
| 6 | 6 m³ (w/diluent) | 0.95 m³ | 0° C. | 9.25% |

A summary of the tests conducted showed that there was a modest reduction in the oil based drilling fluid values from the product tank (sample 1) in the first three tests (samples 2, 3 & 4). Despite the diluent to the liquids phase of unstabilized OBM drill cuttings ratio being very low (ie. 0.5:1 and 1:6), there was a significant reduction in residual hydrocarbons, with only 7.56% being left on the treated cuttings (sample 5) and 9.25% being left on the treated cuttings (sample 6).

While the use of a horizontal wash decanter described herein could remove substantially all of the residual hydrocarbons from the drill cuttings, it could be advantageous to include a second horizontal wash decanter in series, to further facilitate the extraction of residual hydrocarbons, while not requiring additional diluent production.

Such a process flow would include a storage/feed hopper connected to the apparatus by means of a gas tight conduit, wherein the first horizontal wash decanter receives the first slurry phase for processing and creates a second liquids phase and second solids phase (containing less OBM and more solids). The second liquids phase would be pumped to polishing decanters while the second solids phase would be mixed with clean diluent prior to being conveyed through a gas tight conduit to the second horizontal wash decanter.

The second horizontal wash decanter would create a third liquids phase and third solids phase (containing substantially no residual hydrocarbons and more solids). The third liquids phase would be conveyed to the gas tight conduit between the storage/feed hopper and the first horizontal wash decanter, wherein the third liquids phase would mix with the feed of oil based drilling mud-drill cuttings, creating the first slurry phase, which would be processed by the first horizontal wash decanter.

As described herein, the problems described and others in this area are addressed with the process and apparatus described herein. Thus, the scope of the process and apparatus shall include all modifications and variations that may fall within the scope of the attached claims. Other embodiments of the process and apparatus will be apparent to those skilled in the art from consideration of the specification and practice of the process and apparatus disclosed herein. It is intended that the specification and examples be considered as exemplary only, with a true scope and spirit of the process and apparatus being indicated by the following claims.

What is claimed is:

1. A process for liquid phase-solids phase separation of oil based drilling fluid-containing drill cuttings, comprising adding a diluent to the drilling fluid-containing drill cuttings to form a mixture and conveying the mixture into a primary feed tube of a horizontal washing decanter centrifuge, the process being performed in a gas-tight environment preventing escape of diluent from the process into the external atmosphere and preventing introduction of oxygen containing air into the process from the external atmosphere, wherein the diluent is added to the drilling fluid-containing drill cuttings at a rate so as to achieve a drilling fluid-containing drill cuttings feed, the liquid phase thereof having a yield point of equal to or less than 1.0 Pa, prior to the mixture entering the primary feed tube, or wherein the diluent is added to the drilling fluid-containing drill cuttings at a rate so as to alter a plastic viscosity of the mixture to less than 5.0 cP.

2. The process of claim 1 wherein the diluent has a flashpoint less than or equal to 37° C.

3. The process of claim 1 wherein the mixture has a flashpoint less than or equal to 37° C.

4. The process of claim 1 wherein the diluent has a vapour pressure equal to or greater than 0.1 Torr and less than 750 Torr.

5. The process of claim 1 including adding inert gas to the horizontal washing decanter centrifuge so as to maintain an oxygen content of less than 9% by volume within the horizontal washing decanter centrifuge.

6. The process of claim 5 wherein the gas comprises nitrogen or carbon dioxide or fuel gas, or a combination thereof.

7. The process of claim 1 wherein the oxygen content within the horizontal washing decanter centrifuge is maintained below the minimum oxygen content required for ignition of the diluent.

8. The process of claim 1 wherein the solids phase discharged from the horizontal washing decanter centrifuge contains less than 10% by volume diluent.

9. The process of claim 1 wherein the solids phase discharged from the horizontal washing decanter centrifuge contains less than 5% by volume diluent.

10. The process of claim 9 wherein the horizontal washing decanter centrifuge operates at an internal pressure greater than −200 Torr and less than 750 Torr.

11. The process of claim 1 including drying the solids phase discharged from the horizontal washing decanter centrifuge to recover substantially all diluent from the solids phase.

12. The process of claim 11 wherein the solids are dried using a hollow flight solids dryer or a heated air or gas dryer.

13. The process of claim 1, including pre-treating and/or post-treating processing in fluid flow communication with the separation process through a hermetically sealed conduit.

14. The process of claim 13 wherein the pre-treating and/or post-treating processing includes solvent wash tanks, additional decanter centrifuge(s) or solids drying.

15. The process of claim 1 wherein the diluent comprises a first diluent mixed with the drilling fluid-containing drill cuttings forming a first primary mixture of diluent and drilling fluid-containing drill cuttings, prior to being conveyed into the primary feed tube and a second diluent added sequentially to a rinse inlet of a diluent rinse feed tube so that the second diluent comes in contact with the first primary mixture midway along a beach section of the horizontal washing decanter as the liquids and solids are being separated into separate phases.

16. The process of claim 15 wherein the diluents are the same or different.

17. The process of claim 15 wherein the diluents have a flashpoint less than or equal to 37° C.

18. The process of claim 15 wherein the rinse diluent or diluents have a vapour pressure equal to or greater than 0.1 Torr and less than 750 Torr.

19. The process of claim 15, in fluid flow communication with one or more additional processes including shale shakers, or high-speed vertical centrifuge dryers, or solvent wash tanks, or polishing decanters, or solids dryers, or combinations thereof, being performed in a gas-tight environment, thereby preventing escape of diluent from the additional process or processes into the external atmosphere and preventing introduction of oxygen containing air into the process from the external atmosphere.

20. The process of claim 15, wherein a secondary rinse feed tube is located opposite the primary feed tube.

* * * * *